Nov. 24, 1959   M. O. LONGSTRETH ET AL   2,913,763
ASSEMBLY FOR SUPPORTING CENTER CORES IN ANNULAR
SUPPLY PASSAGEWAYS FOR CIRCUMFERENTIAL
EXTRUSION DIES AND THE LIKE
Filed Oct. 22, 1956
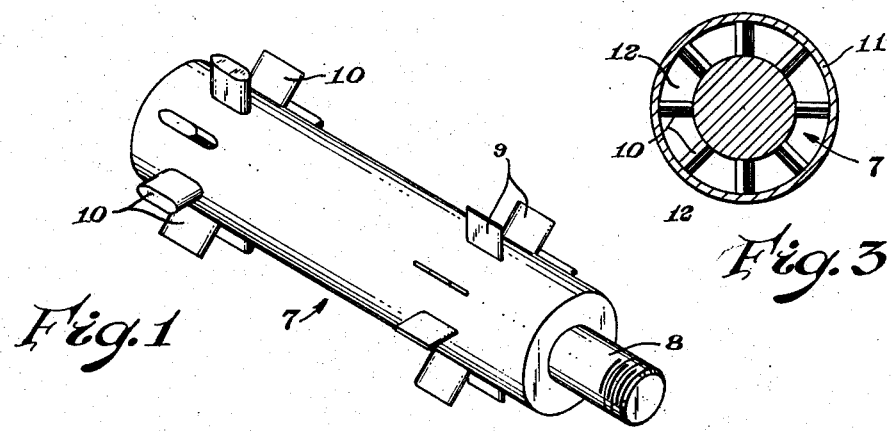
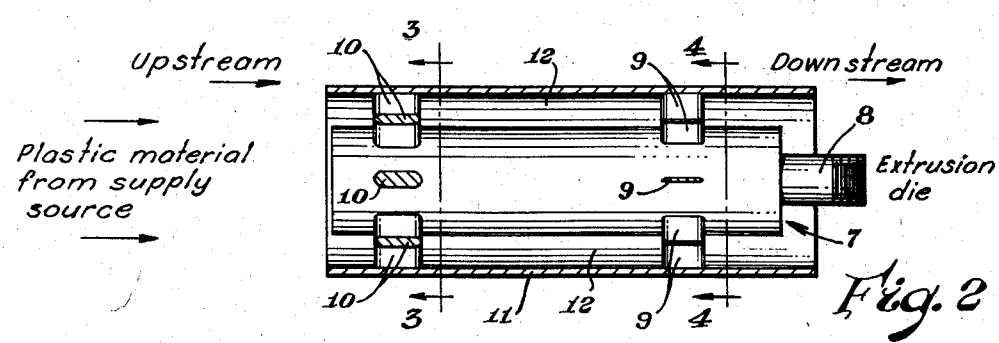
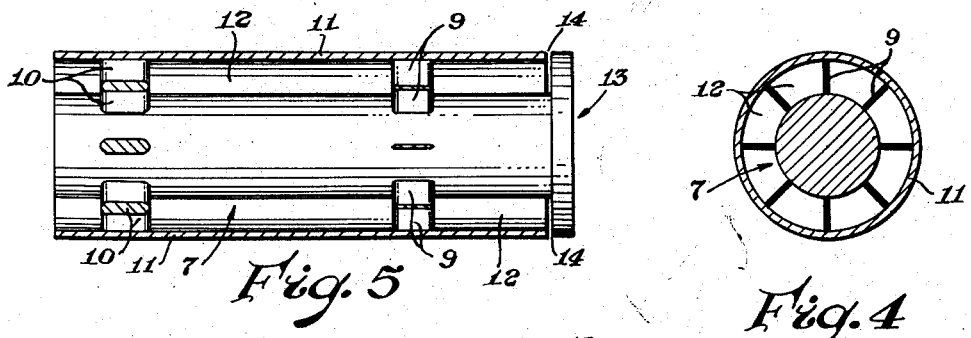
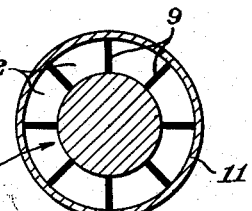
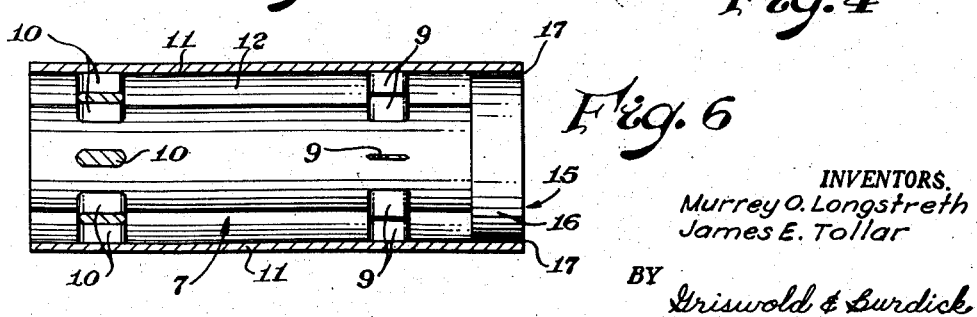
INVENTORS.
Murrey O. Longstreth
James E. Tollar
BY
*Griswold & Burdick*
ATTORNEYS

United States Patent Office 2,913,763
Patented Nov. 24, 1959

2,913,763

ASSEMBLY FOR SUPPORTING CENTER CORES IN ANNULAR SUPPLY PASSAGEWAYS FOR CIRCUMFERENTIAL EXTRUSION DIES AND THE LIKE

Murrey O. Longstreth and James E. Tollar, Midland, Mich., assignors to The Dow Chemical Company, Midland, Mich., a corporation of Delaware Application October 22, 1956, Serial No. 617,529

4 Claims. (Cl. 18—14)

There exist many types and varieties of extrusion dies which are adapted to express film-forming or the like plastic compositions in a circumferential manner about a center. Conventional tubing dies which consist essentially of outer die rings within which inner cylindrical mandrel members are concentrically positioned to provide suitable opposing cylindrical land surfaces for the material being extruded are typical of such dies. Besides these, there have recently become available novel and exceptionally advantageous "pancake" dies which are adapted to omniradially express a centrally supplied plastic material into discoplanate configurations or other discoid forms through relatively flat and ring-like land surfaces that are provided by circumferential opposing lips which lie in generally flat disposition in the dies. The copending application of the present inventors having Serial No. 492,439, now U.S. Patent No. 2,769,200, which was filed on March 7, 1955, for a Radial Extrusion Die is representative of a basic embodiment of such a novel "pancake" type die. Another omniradial extruding die of this nature is disclosed by the same inventors in their copending application for an Adjustable Extrusion Die having Serial No. 561,475, which was filed on January 26, 1956.

In either the conventional tubing or "pancake" types of dies, the film-forming or other plastic material is generally supplied under suitable extrusion pressure to the die head through an annular feed passageway leading to the circumferential die orifice. The annular passageways are usually comprised of an outer cylindrical conduit connected with the plastic supply source (such as an extruder or other metering and forwarding means) in which there is concentrically and coaxially positioned a core upon which the die head itself is ordinarily mounted at the end of the conduit. It is essential, for optimum results, that uniform clearance be circumferentially maintained in such annular supply passageways. This requires accurate and precise centering of the core in the conduit. The means for effecting such centering must also be sturdy enough to provide the usually substantial support that is required for all or at least an essential portion of the die head and to withstand the considerable thrust that is generated during extrusion of the plastic through the die orifice.

Conventionally, multi-hole spiders having substantial spoke or web portions that extend between the core and the conduit are provided for the indicated purpose. While such assemblies as are generally utilized have sufficient strength to serve their intended function, they also tend to restrict to a great degree the cross-sectional area of the annular supply passageway leading to the orifice. Besides developing considerable back pressures in the supply line, such restrictions in area may cause extrusion lines or other defects to occur in the extruded material due to its physical separation immediately prior to extrusion while flowing through the restricted cross-section of the supply passageway that is occasioned by the multi-hole supporting spider between the core and conduit.

It is the principal aim and concern of the present invention to provide an improved assembly for supporting center cores in annular supply passageways for circumferential extrusion dies and the like to avoid the difficulties that are encountered with the conventional multi-hole spiders.

To this end, an improved assembly of the character described is comprised essentially of dual downstream and upstream radial support means extending between a core and a conduit that provide an annular feed passageway which is in communication with the orifice in a circumferential extruding die that is mounted on said core at the end of said conduit, said dual support means concentrically and coaxially positioning said core within said conduit with uniform circumferential clearance; the downstream support means nearest to said extrusion die consisting of a number of widely spaced radially extending spokes each having a relatively thin and flat, streamlined configuration and each being disposed substantially parallel to the flow path of said plastic material through said passageway, said downstream spokes being physically adapted by their size to merely maintain said core centered within said conduit; the upstream support means furthest from said die consisting of a lesser number of relatively thick and sturdy streamlined arms that are adapted to bear the thrust load generated by extrusion of said plastic through said die.

Further features and advantages of assemblies in accordance with the invention are manifest in the following description and specification, taken in connection with the schematic representations of the accompanying drawing, wherein:

Figure 1 is a perspective view of a core having dual radial means for its support in a conduit;

Figure 2, partly in cross-section, illustrates the core positioned in a conduit;

Figures 3 and 4 are cross-sections taken along the lines 3—3 and 4—4 respectively; and Figures 5 and 6 schematically represent a "pancake" type omniradially extruding die and a conventional tubing die, respectively, in combination with the assemblies of the invention.

With initial reference to Figure 1, there is shown a core, indicated generally by the reference numeral 7, which has a threaded (or otherwise provided) end 8 for supporting a desired type of circumferential extruding die head (not shown in Figure 1). Thus, it may mount a "pancake" type omniradially extruding die of the mentioned variety or it may support at least the mandrel of a conventional tubing type die having a cylindrical orifice. Nearest the die-mounting end 8 of the core 7 are a plurality of relatively thin and flat, streamline shaped supporting spokes 9 which are uniformly widely spaced and radially extending from the circumference of the core 7. Furthest from the end 8 of the core 7 are a plurality of thick and sturdy arms 10 which also extend radially about the circumference of the core.

As has been indicated, and as is illustrated in Figure 2, the spokes 9 and arms 10 on the core 7 concentrically and coaxially support and position the core within a conduit 11 to provide an annular passageway 12 between the core and the conduit for conducting a flow of plastic material from a supply source (not shown) to the die. The core 7 is disposed within the conduit with the streamline, widely spaced spokes 9 downstream and the sturdy load bearing arms 10 upstream which also have a streamlined configuration. Any suitable means may be employed for fastening the spokes 9 and arms 10 to the interior of the conduit 11. They may even extend into recesses (not shown) which may advantageously be provided for such purpose.

Since the spokes 9 serve only to centrally position the core 7 within the conduit 11 and are not required to bear any thrust load from the die during extrusion, their individual size and total number need only be sufficient to adequately meet such requirements. Thus, as illustrated in Figure 1 and also in Figure 3, they may, without difficulty, have the advantage of being relatively thin and flat and widely spaced about the core 7. The design and shape of the spokes 9 should be suited to enable them to exert only negligible disturbance, from a physical point of view, on the desired laminar flow of plastic through the passageway and to avoid appreciable interference with the isothermal condition of the flowing plastic. In effect, the spokes 9 should permit the plastic to flow past without significant alteration of its fluid flow and temperature profiles and characteristics. The plastic, as it were, should not "know" (or be materially influenced by the fact) that it passed through the spokes 9. Frequently, for example, this may be accomplished when the spokes have a longitudinal (not radially extending) length to width ratio of at least 10–15:1 and when their total flow-restricting cross-section is as little as five percent or less of the total unrestricted area of the annular passageway. It is generally desirable to utilize at least three of the spokes 9 about the core 7 so that the efficient and uniform central positioning of the latter can be readily achieved.

The radial arms 10 are designed to bear the brunt of the thrust load of the die on the core 7 during extrusion. Thus, as illustrated in Figures 1 and 4, the arms 10 must be sturdily and amply proportioned to be sufficiently strong for such purpose. Oftentimes it may be necessary for the arms 10 to restrict as much as 20–30 percent of the area of the annular passageway 12 in order to serve such purpose. The optimum design, proportioning and arrangement of the upstream arms 10 as well as the downstream spokes 9 depends, as will be apparent to those skilled in the art, upon specific requirements during extrusion under particular conditions and with individual apparatus. Such design can be easily arrived at or derived to meet given requirements by application of conventional engineering skills and techniques.

It is generally advantageous for the streamline spokes 9 to be positioned nearest to the die not more than about one-third of the total distance from the die along the annular passageway 12 between the orifice of the die and the thrust bearing arms 10. It is also advantageous for such one-third span of said total distance which lies between the die orifice and the core centering streamline spokes 9 to be roughly equal to at least about the mean diameter of the annular passageway 12. Usually, in conventional sized equipment having, say, four to eight inch diameter annuli, it is desirable for the spacing between the die orifice and the spokes 9 to be a distance which is at least twice or three times as great as the mean diameter of the annular passageway 12. While this generally achieves a suitably non-turbulent manner of flow for the plastic immediately prior to its extrusion, it is to be understood that the exact spacings best suited to the purpose depend to a great extent on and may be varied to accommodate particular flow rates and particular cross-sectional areas in the annular passageway.

As shown in Figure 2, the flow of plastic material from the supply source proceeds first through the openings between the streamlined thrust bearing arms 10 then past the streamlined spokes 10 in a downstream direction towards the die. Such an arrangement permits an extremely uniform flow of the plastic material throughout the circumference of the annular passageway 12. It is a frequent experience that this desideratum may frequently be difficult to achieve when the flowing plastic is forwarded through one side of the conduit at a point relatively near to the die, due to the pressure drops and flow restrictions developed in the flowing plastic while it is encircling the annulus during a unilateral admission of the plastic thereto. In assemblies according to the invention, practically negligible back pressure is developed in the plastic flowing through the annular passageway and uniform pressure throughout the passageway is facilitated by the precise core centering that is involved to obtain an annulus with uniform circumferential cross section. All this, of course, coupled with the streamlined shape of the spokes 9 and their negligible flow-affecting characteristics, eliminates the possibility of developing spider lines and like defects in the plastic material being extruded.

In Figure 5 the dual support assembly is schematically depicted with an omniradially extruding "pancake" type die of the referred to variety, indicated generally by reference numeral 13, supported at the end of the core 7. A discoplanate orifice 14 is formed by the die 13 for extrusion of the plastic material. In Figure 6, a conventional cylindrical tubing die, designated generally by numeral 15, is shown with the mandrel 16 of the die supported at the end of the core 7 to provide the cylindrical orifice 17 between the mandrel 16 and the termination of the conduit 11.

Use of assemblies according to the invention has provided excellent and otherwise practically unobtainable results in the extrusion of plastic films according to the manner that has been disclosed by Murrey O. Longstreth and Turner Alfrey, Jr., using apparatus patterned thereafter, in copending application Serial No. 493,178, now U.S. Patent No. 2,779,053, which was filed on March 9, 1955, for a Method and Apparatus for Producing Oriented Plastic Films.

What is claimed is:

1. A tubing extrusion head assembly for production of film comprising a conduit having an upstream end and a downstream end for transmitting a flowable plastic material from a supply source to a circumferential extruding die at the discharge end of said conduit; a core having an upstream end and a downstream end, said downstream end being disposed toward the discharge end of said conduit, said core being positioned essentially concentrically and coaxially within said conduit; said core and said conduit defining a generally annular passageway communicating between said supply source and said die; said die being mounted primarily on said core at the downstream end of said conduit; said core being maintained in position at said upstream end by a plurality of radially extending arms so constructed and arranged that minimum disturbance in the flow of said plastic through said annular space will result and of sufficient strength to resist deformation under radial and axial operating stresses and thrust from said plastic flowing through said annular space; said downstream end of said core being maintained in position by a plurality of radially extending arms so constructed and arranged that negligible minimum disturbance in the laminar flow and isothermal condition of said plastic discharging from said conduit through said die will result and only of sufficient strength to resist radial operating stresses.

2. A tubing extrusion head assembly for production of film comprising a conduit having an upstream end and a downstream end for transmitting a flowable plastic material from a supply source to a circumferential extruding die at the discharge end of said conduit; a core having an upstream end and a downstream end, said downstream end being disposed toward the discharge end of said conduit, said core being positioned essentially concentrically and coaxially within said conduit; said core and said conduit defining an annular passageway communicating between said supply source and said die; said die being mounted primarily on said core at the downstream end of said conduit; said core being maintained in position at said upstream end by a plurality of radially extending arms so constructed and arranged that only the minimum cross-sectional area of said upstream arms opposes the flow of plastic material through the conduit, said upstream arms being of sufficient structure to have enough strength to resist deformation under radial and axial operating stresses and thrust from plastic flowing through said annular space; said downstream end of said core maintained in position by a plurality of radially extending arms so constructed and arranged that only the negligible minimum cross-sectional area of said downstream arms opposes the flow of plastic material through the conduit, said downstream arms being merely of sufficient structure to have only enough strength to resist deformation under radial operating stresses.

3. A tubing extrusion head assembly for production of film comprising a conduit for transmitting a flowing plastic material to a circumferential extruding die from a supply source; a core positioned concentrically and coaxially within said conduit to provide an annular passageway communicating between the supply source for said plastic and said die, said die being mounted primarily on said core at the end of said conduit; dual downstream and upstream radial support means extending from said core to engage said conduit and position said core therein; the downstream support means nearest to said die consisting of a number of widely spaced, radially extending spokes, each having a relatively thin and flat streamlined configuration and each being disposed substantially parallel to the flow path of said plastic material through said passageway, said downstream spokes being physically adapted by their size to merely maintain said core centered within said conduit; the upstream support means furthest from said die consisting of a lesser number of relatively thick and sturdy streamlined arms that are adapted to bear the thrust load generated by extrusion of said plastic through said die.

4. The assembly of the claim 3 with the downstream spokes being positioned from the die not more than about one-third of the total span of distance between the die and said thrust bearing arms, said one-third distance being roughly equal to at least about the mean diameter of the annular passageway.

References Cited in the file of this patent

UNITED STATES PATENTS

| | | |
|---|---|---|
| 1,371,576 | Royle | Mar. 15, 1921 |
| 2,177,633 | Blackard | Oct. 31, 1939 |
| 2,253,627 | Knowles | Aug. 26, 1941 |
| 2,363,261 | Ritter | Nov. 21, 1944 |
| 2,428,315 | Lester | Sept. 30, 1947 |
| 2,817,113 | Fields | Dec. 24, 1957 |